United States Patent
Huang et al.

(10) Patent No.: US 8,665,894 B2
(45) Date of Patent: Mar. 4, 2014

(54) SCATTER AND GATHER SCHEME FOR AGGREGATING MULTIPLE HIGH SPEED POINT-TO-POINT INTERFACES

(75) Inventors: Yiren R. Huang, San Jose, CA (US); Raymond Kloth, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/598,913

(22) Filed: Aug. 30, 2012

(65) Prior Publication Data

US 2012/0320735 A1    Dec. 20, 2012

Related U.S. Application Data

(63) Continuation of application No. 11/263,609, filed on Oct. 31, 2005, now Pat. No. 8,259,739.

(51) Int. Cl.
*H04L 12/28* (2006.01)
*H04L 12/56* (2011.01)

(52) U.S. Cl.
USPC ............ 370/413; 370/412; 370/415; 370/417

(58) Field of Classification Search
None
See application file for complete search history.

(56) References Cited

U.S. PATENT DOCUMENTS

| | | | | |
|---|---|---|---|---|
| 6,253,297 | B1 * | 6/2001 | Chauvel et al. | 711/167 |
| 6,574,191 | B1 * | 6/2003 | Usukura et al. | 370/216 |
| 6,954,466 | B1 * | 10/2005 | Dalleggio et al. | 370/463 |

* cited by examiner

*Primary Examiner* — Jae Y Lee
(74) *Attorney, Agent, or Firm* — Campbell Stephenson LLP

(57) ABSTRACT

A mechanism for combining plurality of point-to-point data channels to provide a high-bandwidth data channel having an aggregated bandwidth equivalent to the sum of the bandwidths of the data channels used is provided. A mechanism for scattering segments of incoming data packets, called data chunks, among available point-to-point data channel interfaces is further provided. A decision as to the data channel interface over which to send a data chunk to can be made by examining a fullness status of a FIFO coupled to each interface. An identifier of a data channel on which to expect a subsequent data chunk can be provided in a control word associated with a present chunk of data. Using such information in control words, a receive-end interface can reassemble packets by looking to the control word in a currently processing data chunk to find a subsequent data chunk.

19 Claims, 8 Drawing Sheets

SCATTER AND GATHER SCHEME FOR AGGREGATING MULTIPLE HIGH SPEED POINT-TO-POINT INTERFACES

CROSS-REFERENCE TO RELATED APPLICATIONS

This application is a continuation of U.S. patent application Ser. No. 11/263,609, entitled "SCATTER AND GATHER SCHEME FOR AGGREGATING MULTIPLE HIGH SPEED POINT-TO-POINT INTERFACES" filed Oct. 31, 2005 now U.S. Pat. No. 8,259,739 and naming Yiren R. Huang, Raymond Kloth as the inventors. This application is assigned to Cisco Technology, Inc., the assignee of the present invention, and is hereby incorporated by reference in its entirety and for all purposes as if completely and fully set forth herein.

FIELD OF THE INVENTION

The present invention relates to communications devices, and particularly to interfacing at integrated circuits of a communications device.

BACKGROUND OF THE INVENTION

Today's network links carry vast amounts of information. High bandwidth applications supported by these network links include, for example, streaming video, streaming audio, and large aggregations of voice traffic. In the future, network bandwidth demands will increase. Certain applications, such as streaming audio and streaming video, can generate a large amount of network traffic due to sending such a transmission to multiple subscribers. In order to transport such large amount of data, network routing and switching devices need to be able to accept this large amount of data on a physical interface port and internally communicate that data to a switching matrix from a line card coupled to the network ports.

In a data communication network, network routing and switching devices receive messages at one of a set of input interfaces and forward those messages on to one or more of a set of output interfaces. Users typically require that such routing and switching devices operate as quickly as possible in order to keep pace with a high rate of incoming messages. In a packet-routing network, where information messages are transmitted in discrete packets of data, each packet includes a header. A routing or switching device uses the header information for routing the packet to an output interface for subsequent forwarding to a destination device. A routing device can forward a packet to another routing device for further processing or forwarding.

FIG. 1 is a simplified block diagram of a generic packet routing device 100. In FIG. 1, network device 100 is a router, but much of the description below can be applied to any network device utilized in the transfer of data in a network (e.g., a switch, a bridge, or a network storage processing device). Similarly, the concepts presented below in the detailed description of the invention section can be applied to any network data transfer device.

Network device 100 includes a number of line cards 105(1)-(M), each having similar circuitry and each coupled to a switch fabric 180. Herein, line card 105 refers to any of line cards 105(1)-(M), unless otherwise specified. Various hardware and software components associated with network device 100 are not shown in order to aid clarity.

In FIG. 1, line card 105 transmits and receives datastreams to and from clients (not shown) coupled to a local network 110. Incoming datastream packets from network 110 are received by ports 120(1)-(N) on line card 105. From ports 120(1)-(N), the packets are transferred to a receive port ASIC 130. The receive port ASIC 130 can transfer the packets to a receive forwarding ASIC 150 via point-to-point interfaces 140 and 145. From receive forwarding ASIC 150, packets can be transferred to receive processor module 160 and subsequently switch fabric interface 170. Such transfers can also be performed by point-to-point interfaces similar to 140 and 145. Generally, switch fabric interface 170 can convert a datastream from one format (e.g., packets) to another format (e.g., common switch interface cells). From switch fabric interface 170, converted packets are transferred to switch fabric 180. In a similar fashion, packets can be transferred from switch fabric 180 to client devices coupled to network 110 via a transmit path that includes the switch fabric interface 170, transmit processor module 165, transmit forwarding ASIC 190 and transmit port ASIC 135.

Using present network technology, ports 120(1)-(N) can receive data at rates in excess of 10 Gb/s. Since multiple ports can simultaneously supply datastreams to receive port ASIC 130, it is desirable that receive port ASIC 130 and an interface from that ASIC intended to transmit the datastreams be configured to support such high rates of data transfer. If the point-to-point interface from 140 to 145 cannot support a transfer rate sufficient to handle the incoming data from ports 120(1)-(N), then the point-to-point interfaces can become a data bottleneck in the line card.

FIG. 2A is a simplified block diagram illustrating a port ASIC 210 (such as receive port ASIC 130) and a forwarding ASIC 220. Port ASIC 210 receives data packets on input interfaces 230(1)-(N), wherein each of the input interfaces can correspond to a physical port (e.g., ports 120(1)-(N)). Port ASIC 210 can in turn transmit the data packets via a point-to-point interface 240. Data packets transmitted from point-to-point interface 240 can be received by the forwarding ASIC 220 at interface 250 and then processed accordingly. An example of a point-to-point interface 240 is a System Packet Interface Level 4 Phase 2 (SPI-4.2) interface. In such a configuration as illustrated in FIG. 2A, the data-throughput bandwidth of a system including port ASIC 210 and forwarding ASIC 220 is limited by the bandwidth of interfaces 240 and 250. As an example, an SPI-4.2 interface can be 16 pairs of approximately 800 Mb/s signals resulting in 12.8 Gb/s of total bandwidth in current art.

FIG. 2B is a simplified block diagram illustrating an alternative interface coupling between a port ASIC and a forwarding ASIC. In FIG. 2B, port ASIC 215 is coupled to forwarding ASIC 225 via a plurality of point-to-point interfaces 245(1)-(N) to interfaces 255(1)-(N), respectively. Each point-to-point interface 245(1)-(N) can correspond to a port interface 230(1)-(N). Therefore, each incoming port has its own channel from port ASIC 215 to forwarding ASIC 225. While the scheme illustrated in FIG. 2B provides a greater total bandwidth between port ASIC 215 and forwarding ASIC 225 than that illustrated in FIG. 2A, each individual data path can still become bandwidth limited when a single port receives a burst of high-bandwidth traffic that exceeds the bandwidth of its associated channel between port ASIC 215 and forwarding ASIC 225. Although there is a large total bandwidth between the port ASIC and the forwarding ASIC, there is no means to share available bandwidth on any channel with a channel that has become bandwidth limited.

Solutions that have been traditionally used to address the bandwidth-limitation problem in point-to-point interface connections can be difficult to implement or are of limited utility. One solution has been to drive the point-to-point interface, and therefore the ASIC, at a higher frequency (e.g., 2.4 Gigahertz). Higher frequencies, however, are more difficult to implement with current ASIC technology. Another traditional solution has been to attempt to balance the load over the multiple channels based on a hash function related to traffic flow characteristics. However, a hash result does not necessarily provide full load balancing at any given point in time. Another scheme to solve bandwidth limitation problems aligns two point-to-point interfaces in parallel to effectively provide a single wider data conduit. Such a scheme can have significant skewing problems that require frequent aligning of data through the use of alignment control words. As frequencies scale up, more alignment control words are sent and utilization of the available bandwidth from the parallel interfaces becomes less.

What is therefore desired, is a mechanism of point-to-point communication that provides a higher usable data bandwidth to avoid a data bottleneck at the point-to-point communication interface. It is further desired, that such a method reduce wasted bandwidth through the use of load balancing among all available point-to-point data paths.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention uses a plurality of point-to-point data channels to provide a high bandwidth data channel having an aggregated bandwidth substantially equivalent to the sum of the bandwidths of the individual data channels used. One aspect of the present invention provides a scheme for scattering segments of incoming data packets, called data chunks, among available point-to-point channel interfaces. A decision as to which interface to send a data chunk to can be made by examining a fullness status of a FIFO coupled to each interface. In one aspect of the present invention, an identifier of a data channel on which to expect a subsequent data chunk is provided in a control word associated with a present chunk of data. Using such information in control words, a receive-end interface can reassemble packets by looking to the control word in a currently processing data chunk to find the next data chunk.

Figure 3:
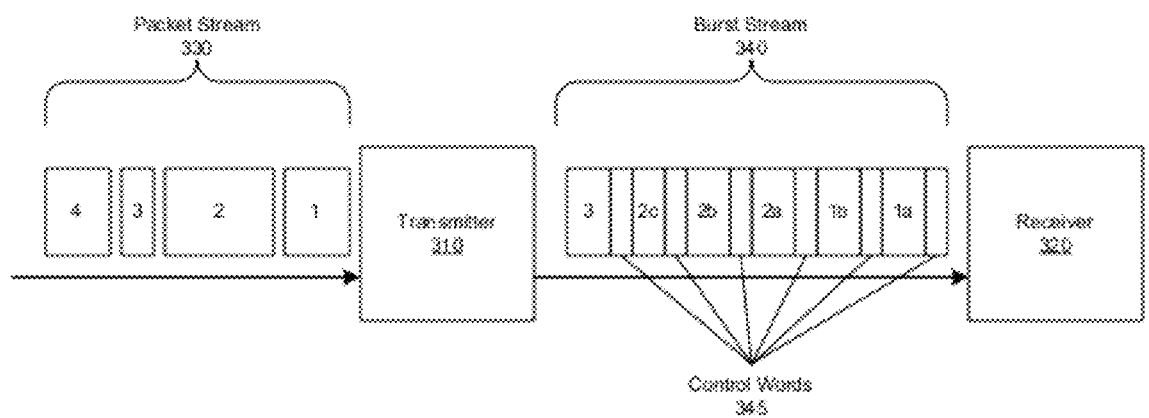
FIG. 3 is a simplified block diagram illustrating a point-to-point transmission protocol.

FIG. 3 is a simplified block diagram illustrating a point-to-point transmission protocol. A transmitter 310 is coupled to a receiver 320. Transmitter 310 receives a packet stream 330 and provides that packet stream as a burst stream 340. Transmitter 320 can receive packets 1-4 in packet stream 330, where packets 1-4 are not necessarily of the same length. Transmitter 310 then divides the incoming packets in packet stream 330 into equal length bursts in burst stream 340 that are interleaved with control words 345. As illustrated, burst 1a and 1b contain data from packet one, while burst 2a, 2b, and 2c contain data from packet two. Each burst, except for the last burst containing a packet's data, is of a fixed length. Control words 345 can include information such as start of packet, end of packet, type of control word, and error correction code. An example of such a point-to-point transmission protocol is the Optical Internetworking Forum System Packet Interface Level 4 Phase 2 (SPI-4.2) (e.g., as presented in OIF-SPI-4-02.1).

Figure 4:
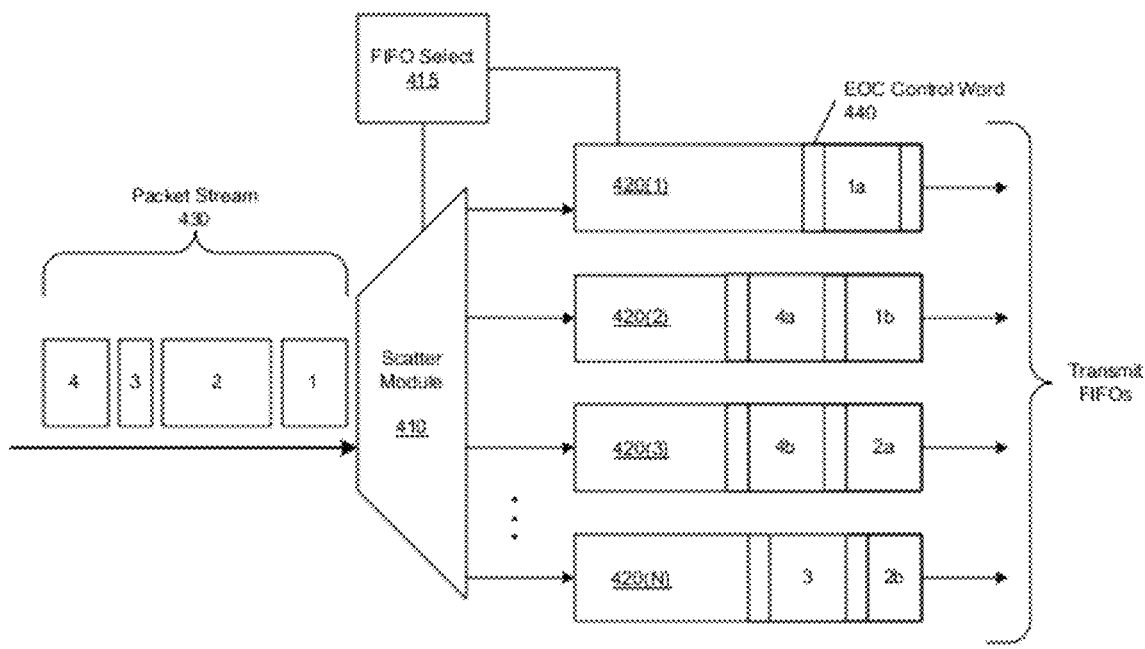
FIG. 4 is a simplified block diagram illustrating a load-scattering scheme for point-to-point data transmission in accord with one embodiment of the present invention.

FIG. 4 is a simplified block diagram illustrating a load-scattering scheme for point-to-point data transmission in accord with one embodiment of the present invention. Incoming packets from a packet stream 430 are divided into equal sized chunks of data (except for a last chunk of a packet) for transmission. A scatter module 410 can distribute each data chunk to a transmit FIFO selected from transmit FIFOs 420(1)-(N). FIFO select module 415 can determine which of transmit FIFOs 420(1)-(N) is to receive a next data chunk by examining each transmit FIFO and applying a selection algorithm. In one embodiment of the present invention, transmit FIFOs are selected on the basis of which transmit FIFO is least full. Scatter module 410 will then send a data chunk to the selected FIFO along with an end-of-chunk (EOC) control word (e.g., 440).

In such a load scattering scheme, data chunks containing contiguous parts of a packet may not be found sequentially in the same transmit FIFO. For example, as illustrated, packet 1 is divided into data chunks 1a and 1b which are associated with transmit FIFOs 420(1) and 420(2) respectively. Similarly, data packet 2 is divided into data chunks 2a and 2b, wherein data chunk 2a is written to transmit FIFO 420(3) while data chunk 2b is written to transmit FIFO 420(N). In the scheme illustrated, FIFO select module 415 selects the next transmit FIFO on the basis of which transmit FIFO is least full. Therefore, data chunk 3 containing all the data from packet 3 is written to transmit FIFO 420(N) after data chunk 2b.

In order to enable a receiving interface to reassemble data packets, scatter module 410 can include in an EOC control word associated with a data chunk an identifier for the next selected FIFO in which the next data chunk can be found, as supplied by FIFO select module 415. Using such an identifier, the receive side of the transmission can locate a subsequent data chunk from which to assemble a data packet. Through the next selected FIFO identifier, the EOC control words can be likened to a linked list that permits the receive side to interpret the order in which data arrived at and was transmitted from the transmit side.

In one embodiment of the present invention, a load-scattering scheme such as that illustrated in FIG. 4 is used in conjunction with multiple transmit interfaces by associating a transmit interface with each one of transmit FIFOs 420(1)-(N). In a further embodiment of the present invention, each transmit interface can be an SPI-4.2 interface. In such an embodiment, a data chunk includes one or more SPI-4.2 data bursts and the EOC control words are a modified version of SPI-4.2 data burst control words. The data burst control words contain additional data beyond standard SPI-4.2 control words, wherein such data is related to the next selected FIFO and whether the control word is associated with an end of data chunk. Table 1 illustrates an EOC control word bit definition that can be used in conjunction with such an embodiment.

TABLE 1

| Bits | Label | Description |
| --- | --- | --- |
| 31:28 | ECC Bits | ECC bits generated over the four bits of EOC and SPI_SEL. |
| 27 | End of Chunk (EOC) | EOC indication. |
| 26:24 | SPI_SEL | SPI Interface select. Example three-bit interface address allows a total of eight SPI interfaces to be load balanced. |
| 23:21 | Type/End of Packet (EOP) Status | Control Word Type and EOP Status (for example): 0: Idle control word 1: Non-EOP 2: EOP Abort 3: Alignment boundary 4: EOP with 1 valid byte 5: EOP with 2 valid bytes 6: EOP with 3 valid bytes 7: EOP with 4 valid bytes |
| 20 | Start of Packet (SOP) | Start of Packet Indicator (for example): 1: Next data burst is SOP 0: Next data burst is not SOP |
| 19:12 | Port Address (ADR) | 8-bit port address of next payload data after the control word (corresponds to next FIFO on transmit side). |
| 11:8 | Parity Bits | Parity bits computed over the current control word and the immediately preceding data words following last control word. |
| 7:0 | Control Code | Extend control code to send/receive data in upper bytes. |

Figure 1:
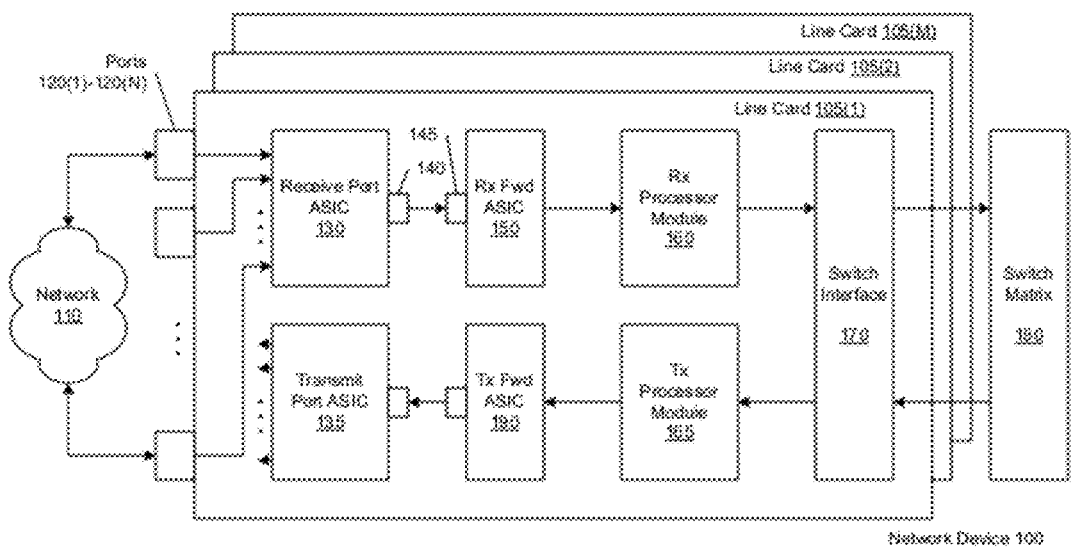
FIG. 1 is a simplified block diagram of a generic packet routing device suitable for implementing embodiments of the present invention.
Figure 2A:
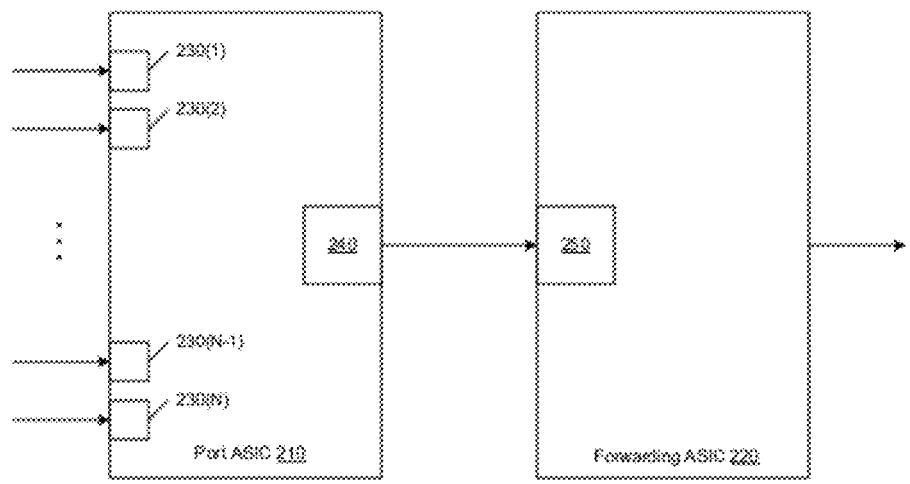
FIG. 2A is a simplified block diagram illustrating a port ASIC and a forwarding ASIC coupled by a single point-to-point interface.
Figure 2B:
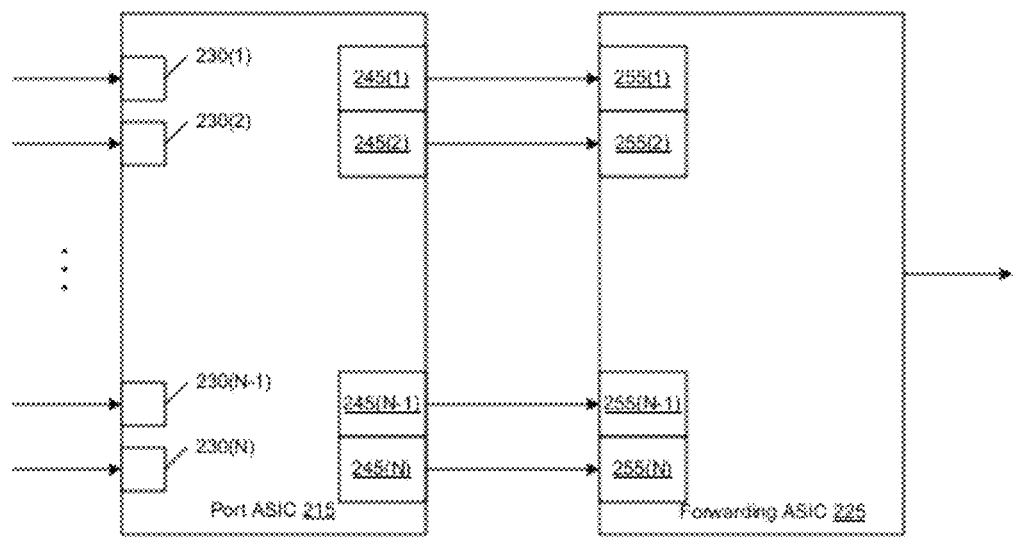
FIG. 2B is a simplified block diagram illustrating a port ASIC and a forwarding ASIC coupled by a multiple point-to-point interfaces.

An example of such EOC control words are 32-bits long in comparison with standard 16 bit SPI-4.2 control words. Using the load-scattering scheme illustrated in FIG. 4 in conjunction with an EOC control word as defined in Table 1 provides a data conduit having a bandwidth equal to the aggregate of each of the channel interfaces associated with transmit FIFOs 420(1)-(N). The individual channels are load balanced to aid in avoiding data bandwidth bottlenecks such as those discussed with respect to FIGS. 2A and 2B.

In the above example, an EOC control word is associated with an SPI-4.2 control word. In one embodiment of the present invention, an SPI-4.2 control word can comprise an EOC control word. In another embodiment of the present invention, an EOC control word can be independent of an SPI-4.2 control word. One goal of the EOC control word is to convey an SPI interface select value (SPI_SEL) from the transmit side of a connection to the receive side of the connection.

Each transmit interface coupled to transmit FIFOs 420(1)-(N) can be of the same bandwidth or can be of differing bandwidths. In either case, the bandwidth of a data path between the transmit and receive sides of the connection is substantially the aggregate of the bandwidths of the individual data paths. In one embodiment of the present invention, a first subset of transmit interfaces can be provided by a first integrated circuit chip processing at a first frequency, while a second subset of transmit interfaces can be provided by a second IC chip processing at a second frequency. Such an arrangement can provide transmit interfaces of different bandwidths corresponding to the first and second IC chips. Corresponding receive interfaces can be matched to the transmit bandwidths.

Figure 5:
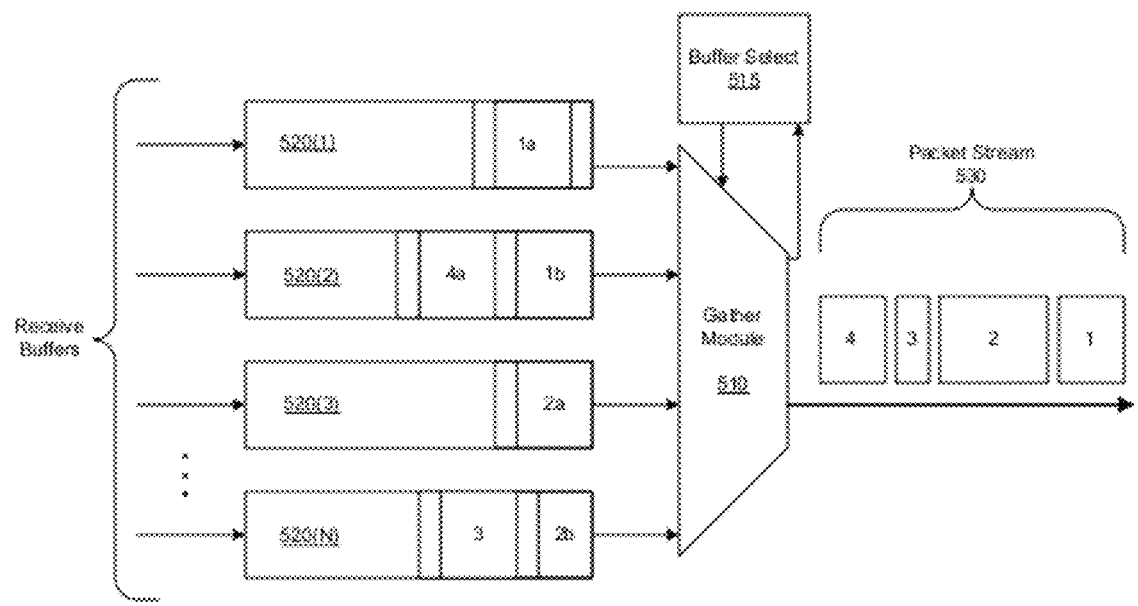
FIG. 5 is a simplified block diagram illustrating a load-gathering scheme in accord with one embodiment of the present invention.

FIG. 5 is a simplified block diagram illustrating a load-gathering scheme in accord with one embodiment of the present invention. The load-gathering scheme illustrated in FIG. 5 is essentially a reverse process to that discussed above with regard to FIG. 4. Gather module 510 receives data chunks from receive buffers 520(1)-(N). Each receive buffer 520 has a corresponding receive interface that receives the data chunks from a corresponding transmit FIFO coupled to a respective transmit FIFO. Gather module 510 will begin reading data chunks from an initial receive buffer. The identity of the initial receive buffer corresponds to the identity of an initial transmit FIFO, so that both the receive and transmit ends begin their process on the same data transmission line, although such initialization can also be achieved by an alignment boundary control word sent on each interface by transmit FIFO. As illustrated, gather module 510 reads data chunk 1a in receive buffer 520(1) and places packet data associated with data chunk 1a in a packet buffer. Gather module 510 also reads an EOC control word associated with data chunk 1a. Buffer select module 515 selects a next receive buffer for a subsequent data chunk based on information in the EOC control word (e.g., ADR from Table 1). In such a manner, gather module 510 will assemble packets in packet stream 530. Such a process will continue for all received data chunks.

Buffer select module 515 can direct gather module 510 to read a data chunk from an initial receive buffer. Such an initial receive buffer can be configured and will have a corresponding initial transmit FIFO on the transmit side of the transmission line. In one aspect of such an embodiment, buffer select module 515 can choose the initial receive buffer in response to a reset of the system or alignment boundary control words sent on each interface. Thus, when a network device incorporating the present invention is reset, both the transmit and receive sides of the transmission line will default to sending and receiving a first data chunk on the initial transmit FIFO and initial receive buffer, respectively.

In a further aspect of such an embodiment, an alignment boundary can be set by the transmission side logic using an EOC control word. At such an alignment boundary, the next transmit FIFO is set to the initial transmit FIFO. When the receive side logic reads an EOC control word containing the alignment boundary, the receive side looks to the initial receive buffer for the next data chunk. As shown in Table 1, an EOC control word can be defined as an alignment boundary through the use of an alignment boundary type. An alignment boundary pointing to an initial interface sent on each interface can also be used to initialize the buffer select on the receive side as an alternative initialization for the receive buffer select discussed above.

Through the use of alignment boundaries, the effect of an error in transmission of an EOC control word can be contained. If an error is detected on an EOC control word, all data chunks up to the next alignment boundary can be dropped by the receive-side logic. The receive-side logic can then look to the initial receive buffer to resume ordering data chunks into data packets. Alignment boundaries can be transmitted after a configured period of time or number of data chunks or can be requested by the receive side when an EOC control word error is detected.

Figure 6:
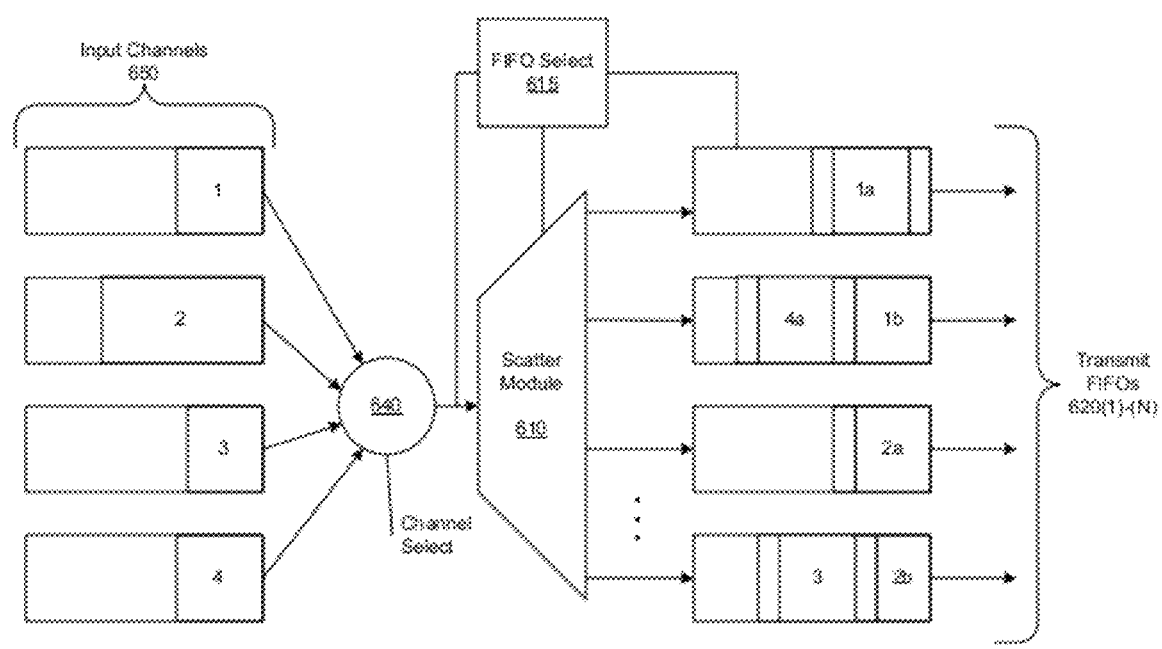
FIG. 6 is a simplified block diagram illustrating an alternate transmit logic in accord with one embodiment of the present invention.

FIG. 6 is a simplified block diagram illustrating an alternate transmit interface logic in accord with one embodiment of the present invention. In FIG. 6, scatter module 610, transmit FIFOs 620(1)-(N) and FIFO select module 615 have similar functional description to that provided above for corresponding modules illustrated in FIG. 4. FIG. 6 additionally illustrates a plurality of input channels 650 providing packets to scatter module 610. Channel select module 640 determines an input channel from which to form a next data chunk to be sent by scatter module 610. In one embodiment of the present invention, channel select module 640 applies a deficit-weighted round-robin arbitration to each channel in selecting the next packet. A weighting assigned to each channel can aid in guaranteeing each channel's bandwidth allocation. Channel select module 640 can also be configured to receive backpressure information from downstream modules to aid in determining whether information from a channel should not be selected and transmitted. Using such a method, a total bandwidth of the point-to-point interfaces can be shared among the input channels and ports associated with those input channels.

Figure 7:
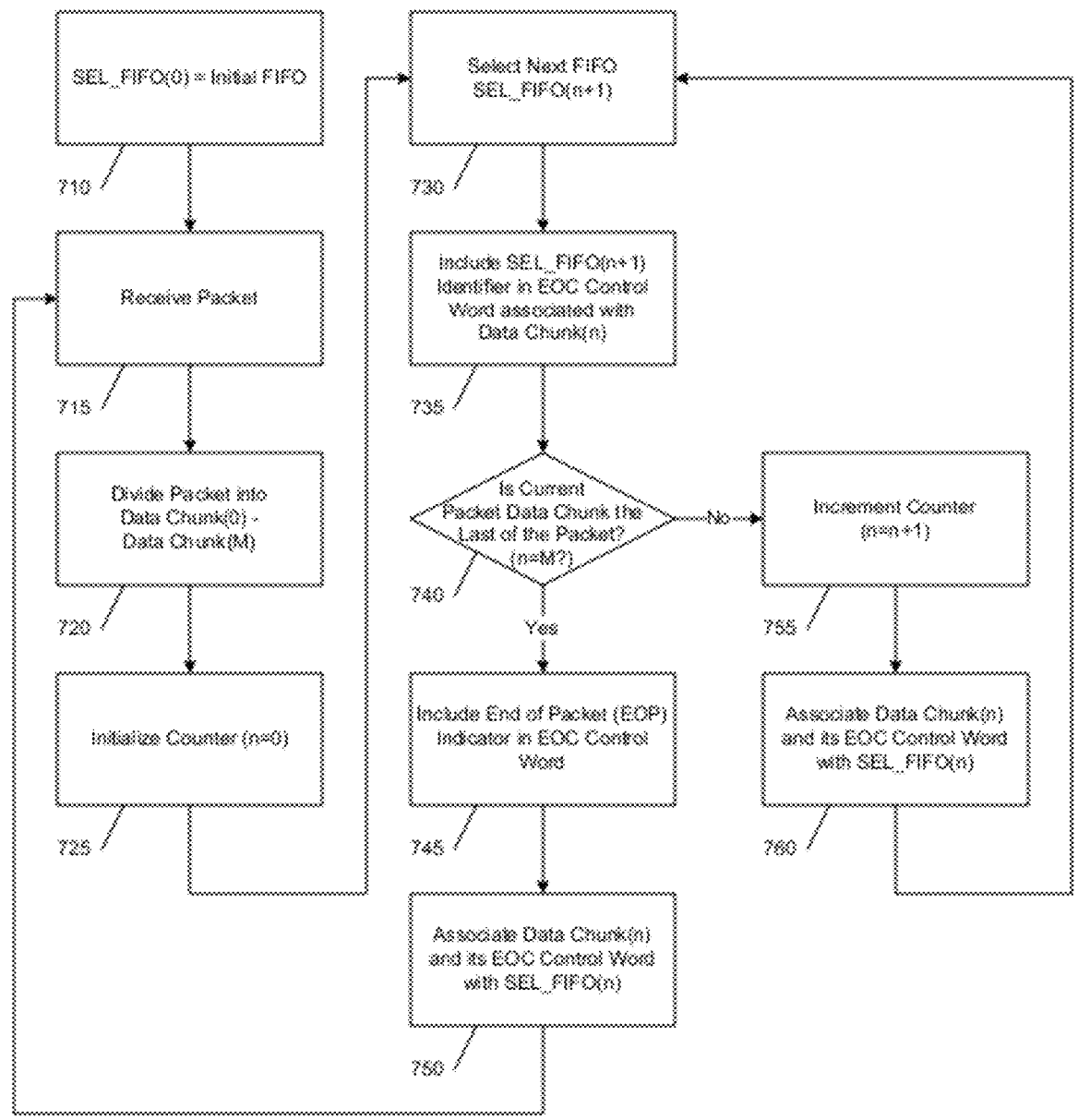
FIG. 7 is a simplified flow diagram illustrating a process performed by a transmit interface in accord with one embodiment of the present invention.

FIG. 7 is a simplified flow diagram illustrating a process performed by a transmit interface in accord with one embodiment of the present invention. An initial FIFO identifier can be selected (SEL_FIFO(0)) (710). Such an initial FIFO identifier can be a configured starting point for data chunk transmission and reception, as described above. A data packet can then be received by the point-to-point transmitter (715). The data packet can then be divided into M data chunks (720). A counter can then be initialized (725).

A next FIFO is selected (SEL_FIFO(n+1)) that corresponds to a transmit FIFO in which the next data chunk will be written (730). As discussed above, such FIFO selection can be performed by determining which is the next least full FIFO. By selecting the next least full FIFO for the next data chunk, load balancing among the transmit interfaces can be provided. A faster transmit interface will empty a corresponding transmit FIFO quicker than a slower transmit interface and therefore can have a larger number of data chunks being written to the transmit FIFO than will the slower transmit interface. A backpressure mechanism can also be provided to indicate if one or more of the transmit FIFOs get above a certain fullness threshold. In response to a backpressure indication, data packets can be dropped or stored according to the configuration of the device. Using such a scheme of least full FIFO selection, interfaces of different speed can thereby be aggregated as a faster interface with bandwidth equal to the total of each individual interface.

Once the next selected transmit FIFO has been identified, an identifier for that transmit FIFO can be included in an EOC control word associated with Data Chunk(n) (735). A determination can be made for whether the currently processed data chunk, Data Chunk(n) is the end of the associated packet (740). If the current data chunk is not the end of packet, the counter can be incremented (755) and the current data chunk, along with an associated EOC control word, can be written to the transmit FIFO selected for that data chunk (e.g., SEL_F-IFO(n) for Data Chunk(n)) (760). The process can be repeated until each data chunk associated with a data packet has been written to an associated transmit FIFO. Once each chunk has been written, an end-of-packet (EOP) indication can be provided in a control word (745) and an EOC control word can be written with the data chunk to a transmit FIFO selected for that data chunk. The next selected FIFO indication in the EOP containing EOC control word will be where the first data chunk of the next packet is written.

Figure 8:
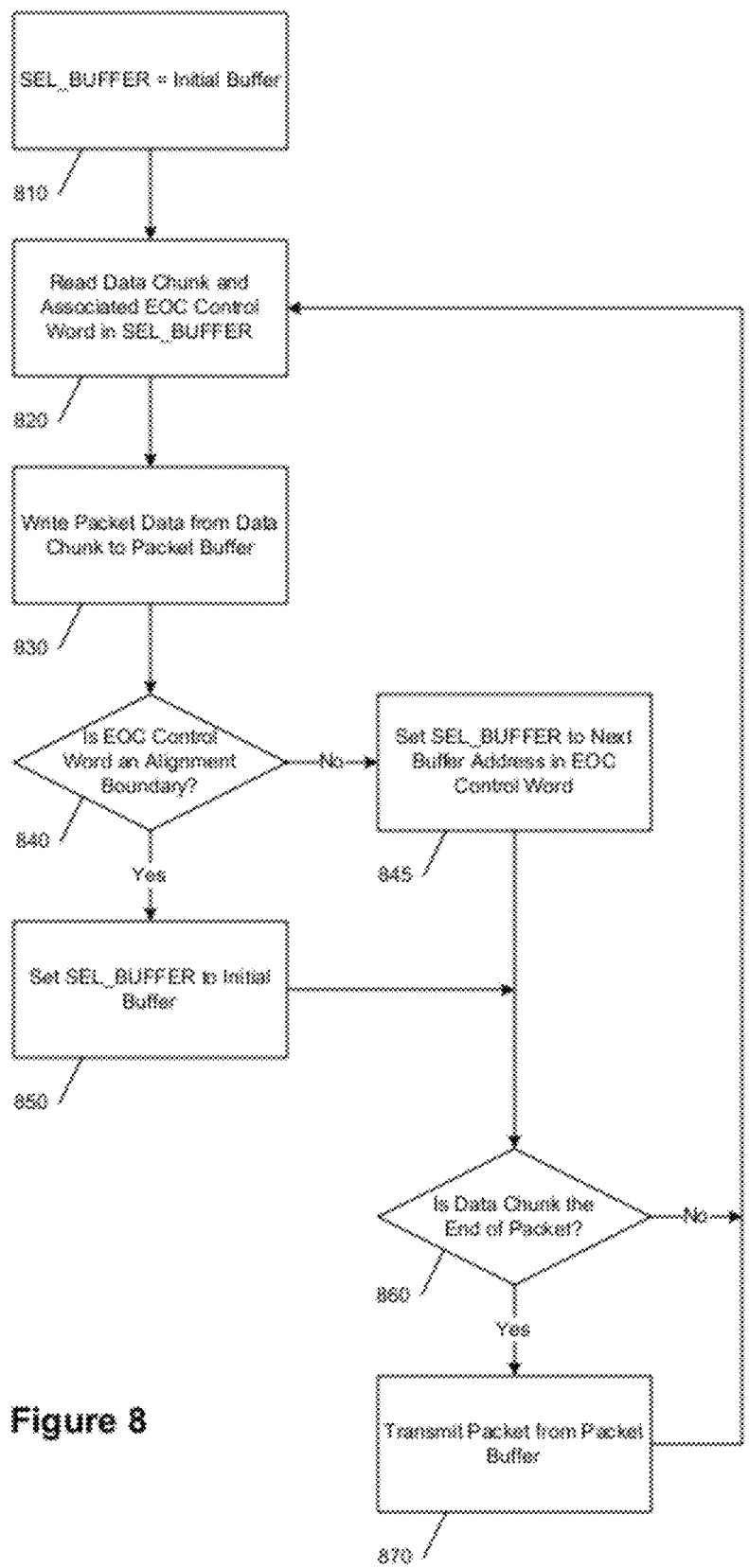
FIG. 8 is a simplified flow diagram illustrating a process for load gathering that can be performed by a receive side of data transmission in accord with one embodiment of the present invention.

FIG. 8 is a simplified flow diagram illustrating a process for load gathering that can be performed by a receive side of data transmission in accord with one embodiment of the present invention. The process illustrated in FIG. 8 can be performed, for example, by the receive logic illustrated in FIG. 5. As in FIG. 5, data chunks are received at a plurality of physical interfaces and the information in those data chunks can be placed in a set of corresponding receive buffers (e.g., 520(1)-(N)). An initial buffer can be defined to which the receive logic can default in the case of, for example, resetting the network router device or receiving an alignment boundary. As an initial step, a selected buffer (SEL_BUFFER) can be set to the initial buffer (810). The receive logic can then read a data chunk and an EOC control word in the selected buffer (820). In order to assemble the packet, the receive logic can write packet information found in the data chunk to a packet buffer (830).

The receive logic can determine where to look for the next data chunk from which to either continue assembling the current packet or to find data for the next packet. The receive logic examines the EOC control word to determine if the control word is an alignment boundary (840). If the EOC control word is designated as an alignment boundary, then the receive logic sets the selected buffer to the initial buffer value (850). If the EOC control word is not an alignment boundary, then the receive logic can set the selected buffer a buffer address identified in the EOC control word (845).

The receive logic can then determine whether the data chunk just read is the end of a packet (860). The EOC control word can be examined to determine if it is designated as an end-of-packet (EOP). If the data chunk is not an EOP, the receive logic can return to step 820 and read the next data chunk and associated EOP control word found at the newly selected buffer. If the data chunk is an EOP, then the receive logic can transmit the packet data from the packet buffer to a next step in a data path for further processing (870). The receive logic can then read a next data chunk and EOC control word in the selected buffer at step 820 continuing on the process of reading incoming data chunks and assembling packets.

Through the use of the present invention, a plurality of point-to-point interfaces can be cooperatively used to present a single, "fat" interface that provides a bandwidth substantially the same as the sum of the bandwidths of the individual interfaces. The number of point-to-point interfaces is not limited by the invention. The bandwidth of each of the plurality of point-to-point interfaces need not be the same in order to receive advantages of the present invention.

An Example Router

Figure 9:
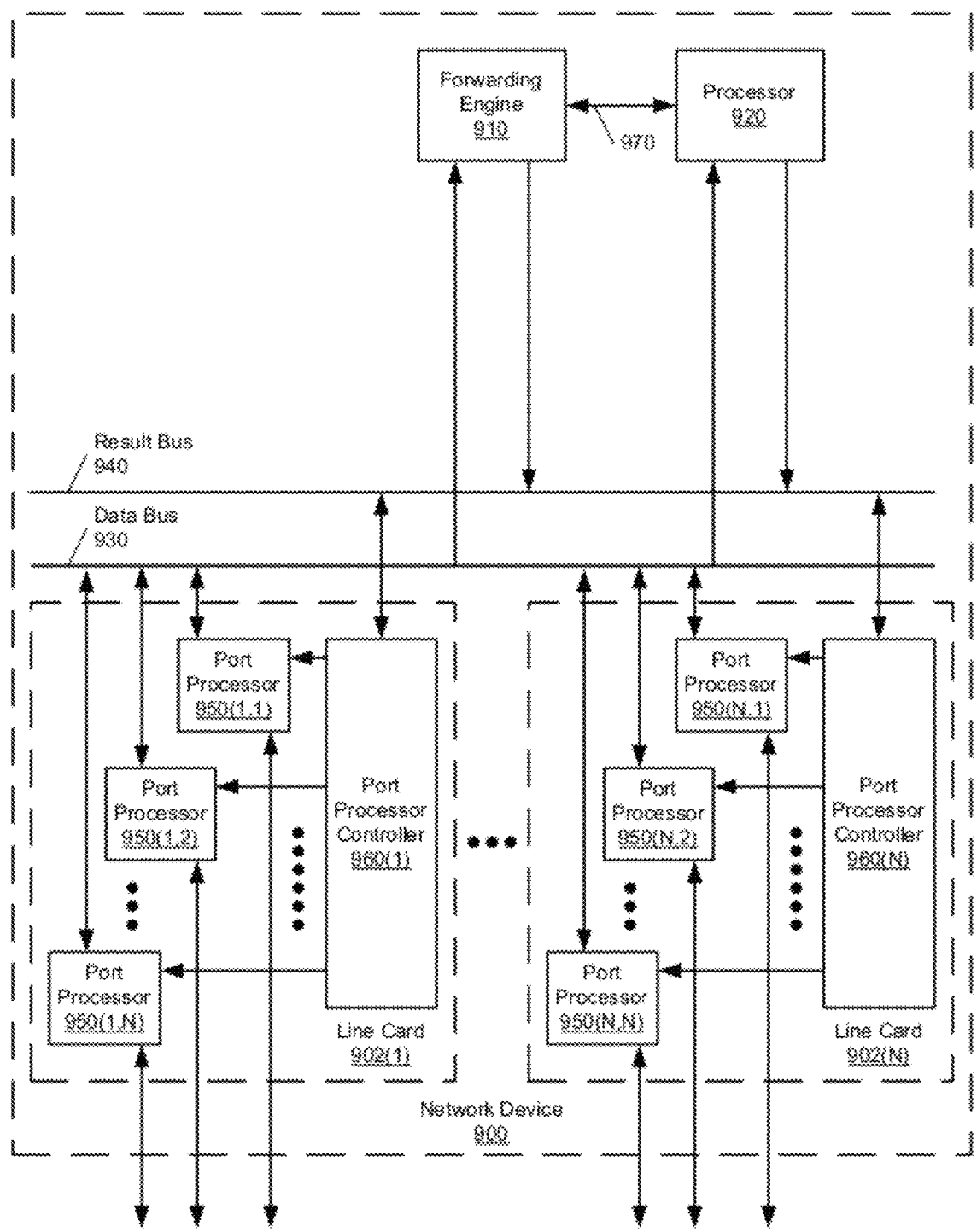
FIG. 9 is a simplified block diagram illustrating another network routing device appropriate for implementing an embodiment of the present invention.

FIG. 9 is a simplified block diagram illustrating another network routing device appropriate for implementing an embodiment of the present invention. In this depiction, network routing device 900 includes a number of line cards (line cards 902(1)-(N)) that are communicatively coupled to a forwarding engine 910 and a processor 920 via a data bus 930 and a result bus 940. Line cards 902(1)-(N) include a number of port processors 950(1,1)-(N,N) which are controlled by port processor controllers 960(1)-(N). It will also be noted that forwarding engine 910 and processor 920 are not only coupled to one another via data bus 930 and result bus 940, but are also communicatively coupled to one another by a communications link 970.

When a packet is received, the packet is identified and analyzed by a network routing device such as network routing device 900 in the following manner, according to embodiments of the present invention. Upon receipt, a packet (or some or all of its control information) is sent from the one of port processors 950(1,1)-(N,N) at which the packet was received to one or more of those devices coupled to data bus 930 (e.g., others of port processors 950(1,1)-(N,N), forwarding engine 910 and/or processor 920). Handling of the packet can be determined, for example, by forwarding engine 910. For example, forwarding engine 910 may determine that the packet should be forwarded to one or more of port processors 950(1,1)-(N,N). This can be accomplished by indicating to corresponding one(s) of port processor controllers 960(1)-(N) that the copy of the packet held in the given one(s) of port processors 950(1,1)-(N,N) should be forwarded to the appropriate one of port processors 950(1,1)-(N,N).

In the foregoing process, network security information can be included in a frame sourced by network routing device 900 in a number of ways. For example, forwarding engine 910 can be used to detect the need for the inclusion of network security information in the packet, and processor 920 can be called into service to provide the requisite network security information. This network security information can be included in the packet during the transfer of the packet's contents from one of port processors 950(1,1)-(N,N) to another of port processors 950(1,1)-(N,N), by processor 920 providing the requisite information directly, or via forwarding engine 910, for example. The assembled packet at the receiving one of port processors 950(1,1)-(N,N) can thus be made to contain the requisite network security information.

In addition, or alternatively, once a packet has been identified for processing according to the present invention, forwarding engine 910, processor 920 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

An Example Network Environment

Figure 10:
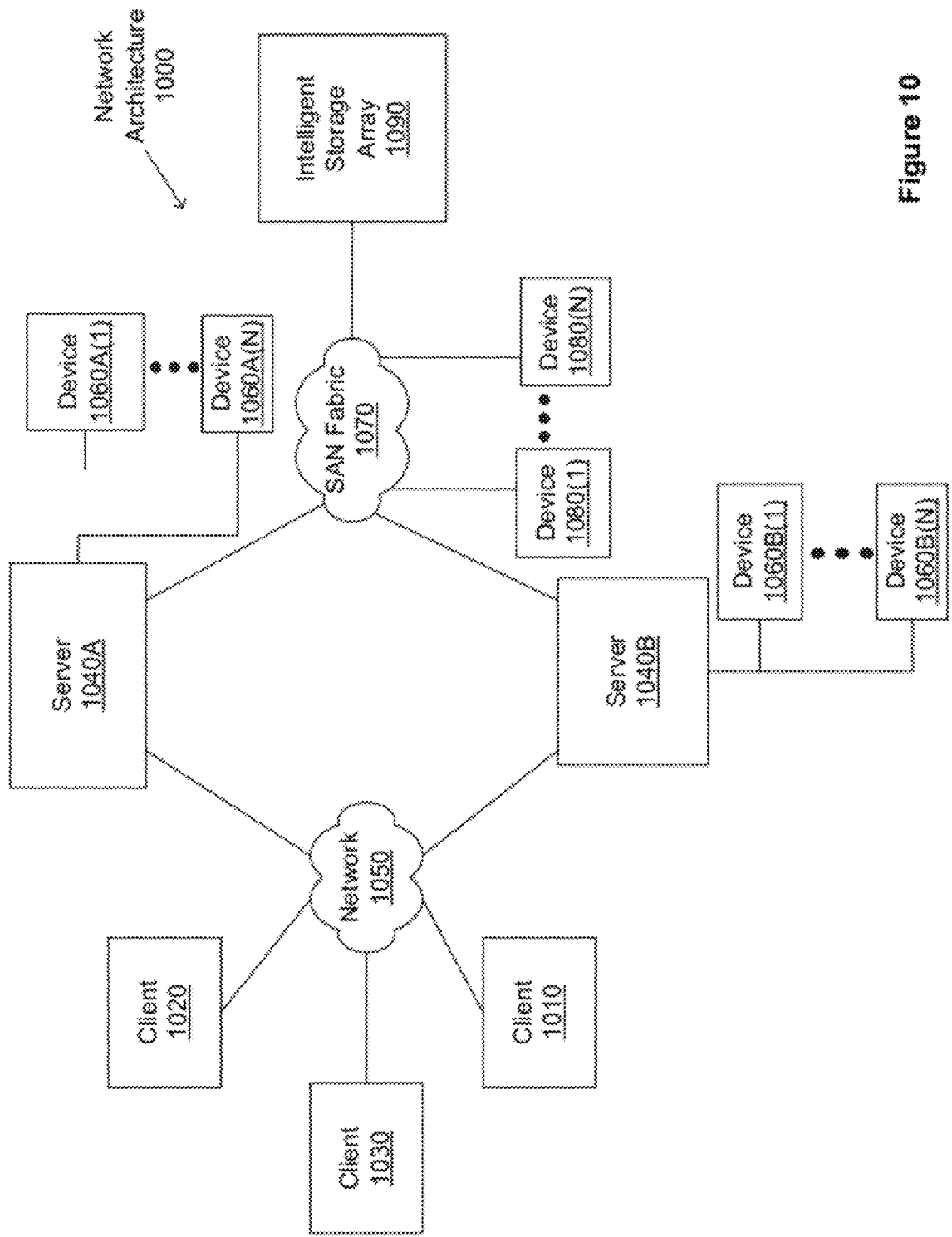
FIG. 10 is a block diagram depicting a network architecture suitable for implementing embodiments of the present invention.

FIG. 10 is a block diagram depicting a network architecture 1000 in which client systems 1010, 1020 and 1030, as well as storage servers 1040A and 1040B, are coupled to a network 1050. Storage server 1040A is further depicted as having storage devices 1060A(1)-(N) directly attached, and storage server 1040B is depicted with storage devices 1060B(1)-(N) directly attached. Storage servers 1040A and 1040B are also connected to a SAN fabric 1070, although connection to a storage area network is not required for operation of the invention. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070.

Client systems 1010, 1020 and 1030 are able to access information on storage server 1040A or 1040B using, for example, a web browser or other client software (not shown). Such a client allows client systems 1010, 1020 and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of network device 100). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
reading a first data chunk from a first receive buffer of a plurality of receive buffers, wherein
the plurality of receive buffers are configured to receive data from a plurality of transmission lines;
reading a first end-of-chunk (EOC) control word from the first receive buffer, wherein
the first EOC control word is associated with the first data chunk;
selecting a next receive buffer of the plurality of receive buffers, wherein
the first EOC control word comprises an identifier of the next receive buffer;
reading a next data chunk from the next receive buffer; and
in response to a determination that a transmission error has occurred,
dropping all data chunks from the plurality of receive buffers, wherein
the data chunks are dropped until a next EOC control word is received on each of the plurality of receive buffers, and
the next EOC control word is designated as an alignment boundary.

2. The method of claim 1, further comprising:
configuring one of the plurality of receive buffers as a default receive buffer, wherein
the plurality of receive buffers are configured to receive a plurality of data chunks, and
the default receive buffer is configured as a preset starting point to begin reading the plurality of data chunks from the plurality of receive buffers.

3. The method of claim 2, further comprising:
in response to receiving the next EOC control word that is designated as the alignment boundary,
selecting the default receive buffer as the next receive buffer, and
resuming reading the plurality of data chunks from the plurality of receive buffers, wherein
the resuming reading comprises
reading the next data chunk from the default receive buffer.

4. The method of claim 2, further comprising:
selecting the default receive buffer as a new next receive buffer instead of a present next receive buffer, in response to a reset request; and
reading the next data chunk from the default receive buffer instead of the present next receive buffer.

5. The method of claim 1, further comprising:
writing first data of the first data chunk to a packet buffer; and
writing second data of the next data chunk to the packet buffer, subsequent to writing the first data chunk to the packet buffer.

6. The method of claim 1, further comprising:
reading a second EOC control word from the next receive buffer, wherein
the second EOC control word is associated with the next data chunk; and
in response to a determination that the second EOC control word is designated as an end-of-packet, transmitting a set of data chunks from the packet buffer as an assembled packet.

7. The method of claim 1, wherein
each of the plurality of receive buffers are coupled to a corresponding point-to-point receive interface.

8. The method of claim 7, wherein
each point-to-point receive interface comprises a System Packet Interface.

9. The method of claim 1, wherein
the plurality of receive buffers are configured in parallel.

10. A system comprising:
a plurality of receive buffers configured to receive data from a plurality of transmission lines;
a gather module coupled to the plurality of receive buffers and configured to:
read a first data chunk from a first receive buffer of the plurality of receive buffers,
read a first end-of-chunk (EOC) control word from the first receive buffer, wherein
the first EOC control word is associated with the first data chunk, and
the first EOC control word comprises an identifier of a next receive buffer, and
read a next data chunk from the next receive buffer;
a buffer select module coupled to the plurality of receive buffers and configured to
select the next receive buffer of the plurality of receive buffers; and
the gather module is further configured to
drop all data chunks from the plurality of receive buffers, in response to a determination that a transmission error has occurred, wherein
the data chunks are dropped until a next EOC control word is received on each of the plurality of receive buffers, and
the next EOC control word is designated as an alignment boundary.

11. The system of claim 10, wherein
one of the plurality of receive buffers is configured as a default receive buffer,
the plurality of receive buffers are configured to receive a plurality of data chunks, and
the default receive buffer is configured as a preset starting point used by the buffer select module to direct the gather module to read the plurality of data chunks from the plurality of receive buffers.

12. The system of claim 11, wherein
the buffer select module is further configured to:
select the default receive buffer as the next receive buffer, in response to receipt of the next EOC control word that is designated as the alignment boundary, and
the gather module is further configured to
read the next data chunk from the default receive buffer.

13. The system of claim 11, wherein the buffer select module is further configured to:
    select the default receive buffer, in response to reset of the system.

14. The system of claim 10, wherein the gather module is further configured to:
    write first data of the first data chunk to a packet buffer; and
    write second data of the next data chunk to the packet buffer, subsequent to the first data chunk to the packet buffer.

15. The system of claim 10, wherein the gather module is further configured to:
    read a second EOC control word from the next receive buffer, wherein the second EOC control word is associated with the next data chunk; and
    transmit a set of data chunks from the packet buffer as an assembled packet, in response to a determination that the second EOC control word is designated as an end-of-packet.

16. The system of claim 10, wherein
    each of the plurality of receive buffers are coupled to a corresponding point-to-point receive interface.

17. The system of claim 16, wherein
    each point-to-point receive interface comprises a System Packet Interface.

18. The system of claim 10, wherein
    the plurality of receive buffers are configured in parallel.

19. The system of claim 10, wherein
    the plurality of transmission lines are coupled to a plurality of transmit FIFO (first in first out) registers,
    the plurality of transmit FIFO registers comprise a transmit side of a data channel, and
    the plurality of receive buffers comprise a receive side of the data channel.

* * * * *